2 Sheets—Sheet 1.
A. G. CRANE & W. T. JOHNSTON.
HARVESTER RAKE.
No. 109,301.                     Patented Nov. 15, 1870.
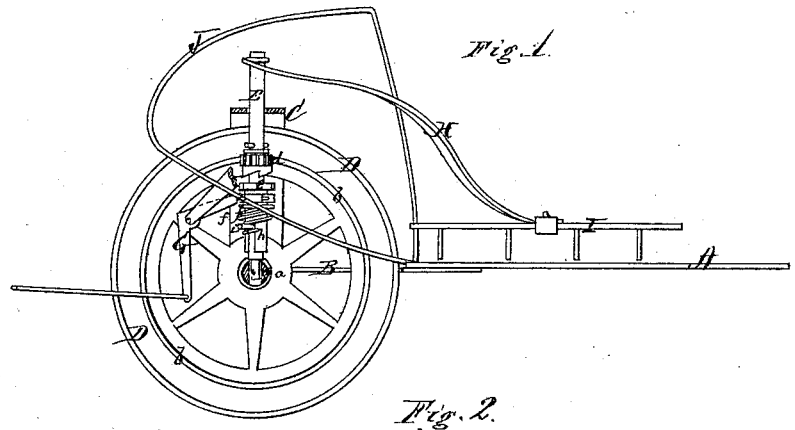
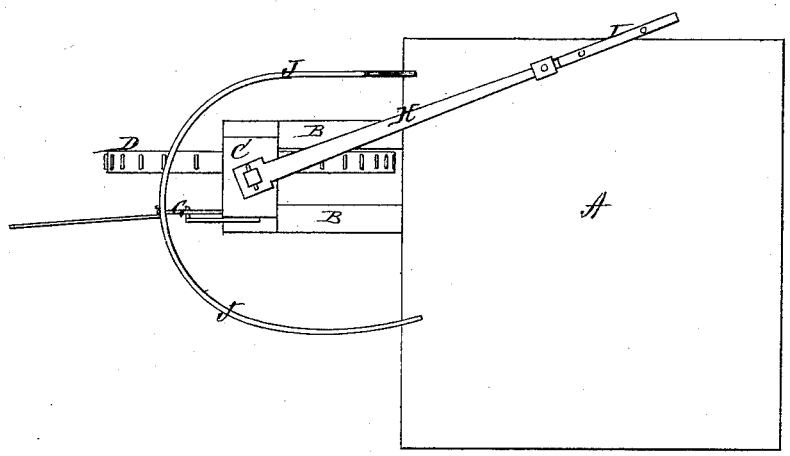

A. G. CRANE & W. T. JOHNSTON.
HARVESTER RAKE.

No. 109,301. Patented Nov. 15, 1870.

Witnesses.  Inventor.

United States Patent Office.

ASAHEL G. CRANE AND WILLIAM T. JOHNSTON, OF OTTUMWA, IOWA.

Letters Patent No. 109,301, dated November 15, 1870.

IMPROVEMENT IN HARVESTER-RAKES.

The Schedule referred to in these Letters Patent and making part of the same.

*To all whom it may concern:*

Be it known that we, ASAHEL G. CRANE and WILLIAM T. JOHNSTON, of Ottumwa, in the county of Wapello and in the State of Iowa, have invented certain new and useful Improvements in Rake-Attachment for Reapers; and do hereby declare that the following is a full, clear, and exact description thereof, reference being had to the accompanying drawing and to the letters of reference marked thereon making a part of this specification.

The nature of our invention consists in a rake-attachment constructed complete with its own propelling mechanism to be attached to a mower, as will be hereinafter fully set forth.

In order to enable others skilled in the art to which our invention appertains to make and use the same, we will now proceed to describe its construction and operation, referring to the annexed drawing, in which—

Figure 1 is a side elevation, and

Figure 2 is a plan view of our rake-attachment.

Figure 3:
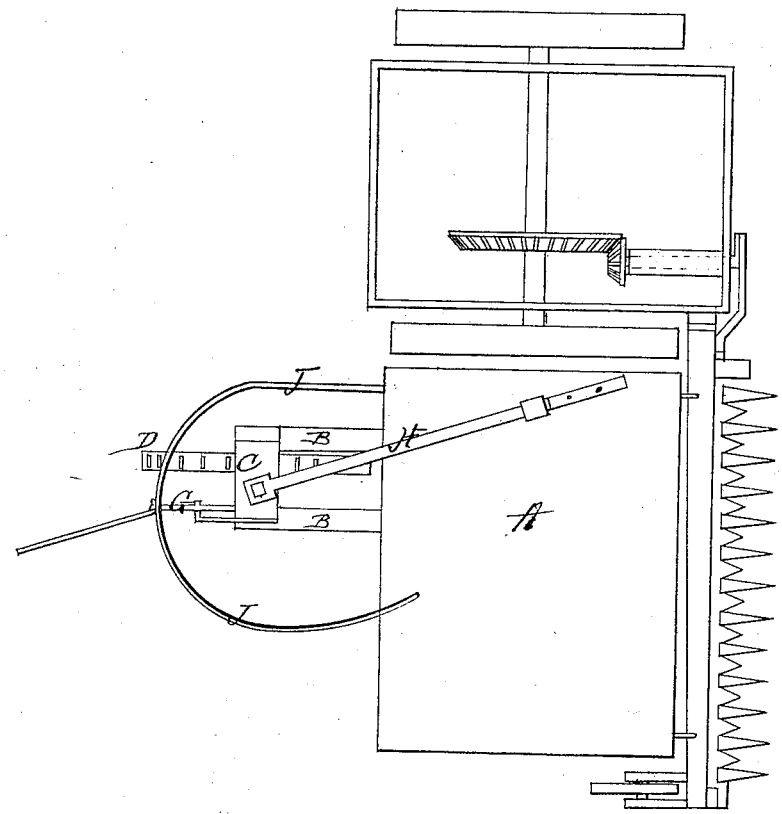
Figure 3 is a plan view of our attachment, showing it connected with a mower.

A represents the table on which the grain falls after being cut.

From the rear edge of the table A extend two arms, B B, which support the frame C at their outer ends.

In the lower end of the frame C a shaft, $a$, is placed, upon which revolves the wheel D.

On the side of this wheel is a cog-wheel, $b$, which gears with a loose pinion, $d$, on the upright shaft E, said shaft having its bearings in the shaft $a$ and frame C.

Below the pinion $d$ on the shaft E is a clutch, $e$, pressed upward against the lower edge of said pinion, which is toothed to fit in the clutch, by means of a spiral spring, $f$.

The clutch $e$ is attached to the upper end of a tube, $h$, through which the shaft E passes, and the lower end of said tube is slotted with a pin, $i$, on the shaft projecting through said slot, so that when the driving-wheel D revolves, it will revolve the shaft E also.

By means of a lever, G, the inner end of which embraces the tube $h$ immediately below the clutch $e$, said clutch and tube are pressed down, so as to throw the clutch out of gear from the pinion $d$, and thus prevent the shaft E from revolving.

On the upper end of the shaft E is placed a bent arm, H, which revolves with the shaft, but is so attached that it can be raised up to a certain height and lowered again.

At the outer end of this arm is attached the rake I.

From the rear edge of the table A rises an inclined plane, J, as shown in the drawing.

The rake I is carried above the uncut grain by means of the inclined plane J, and drops down on the table when it reaches the proper point. It carries the cut grain across the table, deposits it on the side farthest from the uncut grain, leaving room for the reaper to pass on the next round without binding.

The motion of the rake is under the control of the driver, so that he can make the sheaves of uniform size.

This device is attached to a harvester in the following manner:

The platform-table is hinged to the sickle-bar in place of platform or table on which the grain falls, of machines for hand-raking. The wheel D being at the back part of the platform, supports it.

From the above it will be seen that our rake-attachment is complete in itself, carries its own propelling power or mechanism, and is in no way dependent upon the mechanism of the mower. It is hinged or hooked to the cutter-bar, and can be attached or detached in an instant.

Having thus fully described our invention,

What we claim as new, and desire to secure by Letters Patent, is—

1. In combination with detachable platform A, the wheel D, rake H I, and cam-guide J, all the parts being constructed and operating as described.

2. In combination with the above, the clutch $e$, tube $h$, pin $i$, and spring $f$ on the shaft E, all as and for the purposes herein set forth.

In testimony that we claim the foregoing, we have hereunto set our hands this 29th day of June, 1870.

ASAHEL G. CRANE.
    WILLIAM T. JOHNSTON.

Witnesses:
  J. T. HACKWORTH,
  EDWIN WHITE.